Aug. 7, 1962 R. G. NEVILLE 3,048,666

TRANSDUCER WITH LOW MICROPHONICS

Filed Feb. 5, 1959

INVENTOR
RICHARD G. NEVILLE
BY [signature]
ATTORNEY 3,048,666

TRANSDUCER WITH LOW MICROPHONICS

Richard G. Neville, Poughkeepsie, N.Y., assignor to International Business Machines Corporation, New York, N.Y., a corporation of New York Filed Feb. 5, 1959, Ser. No. 791,370

4 Claims. (Cl. 179—100.2)

This invention relates to magnetic transducers and more particularly to a reading head having low microphonics.

Magnetic reading heads in most instances are microphonic, i.e., produce spurious signals when subjected to mechanical strain. There are a number of reasons for this, the most important of which is due to strain set up in the materials used for the magnetic core of the reading head while it is magnetized. In many instances, the material is well adapted for use in reading magnetic data from a non-magnetic carrier while at the same time it may be highly sensitive to mechanical strains set up by the data carrier while being moved with relation to the head. This action if it causes mechanical strain within the core will generate spurious signals. If the reading head is used as an input device for a calculator the unwanted signals effect false entries.

This phenomenon is known as the Villari effect which has been defined as a change in magnetic induction within an iron rod due to longitudinal stress.

It is therefore the principal object of this invention to provide a reading head wherein the microphonics are reduced to a minimum.

Another object is to provide a method of winding the reading coils on a magnetic reading head whereby the noise ratio is reduced to a minimum.

A further object of the invention is to provide means to eliminate the Villari effect in the core of a magnetic transducer.

A still further object is to provide an efficient and simple reading head having low microphonics.

Other objects of the invention will be pointed out in the following description and claims and illustrated in the accompanying drawings, which disclosed by way of example, the principle of the invention and the best mode which has been contemplated of applying that principle.

Figure 1:
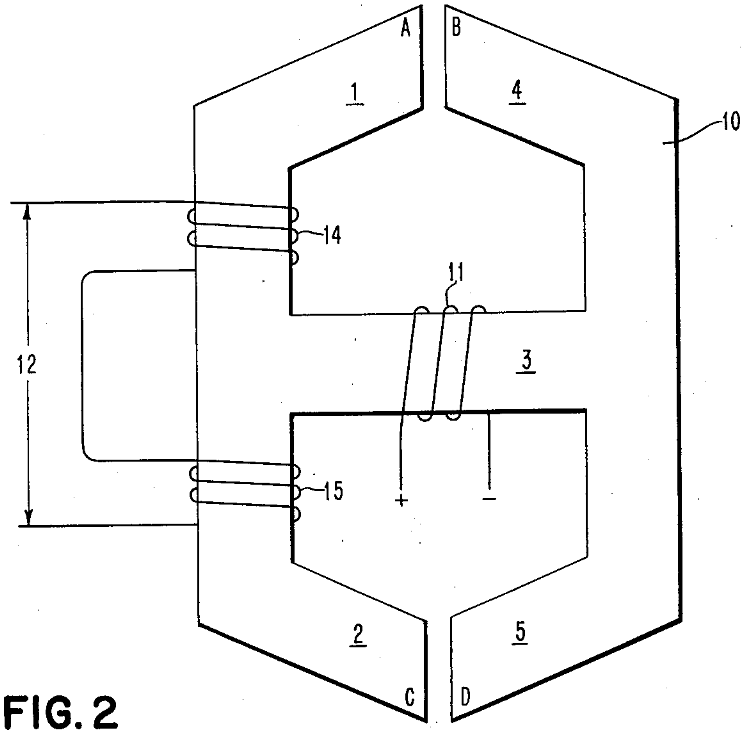
FIG. 1 is a schematic showing of the invention.

In practising the invention the transducer as shown in FIG. 1 comprises a core 10 having a figure eight configuration on the center bar of which is wound a bias winding 11. The upper and lower portions of the core are provided with air gaps A—B and C—D. It will be assumed that gap A—B is used for reading a magnetic record. The winding 11 is connected to any direct current source and produces an equal flux path in both ends of the core for over paths 1–A–B–4–3 and 2–C–D–5–3. A reading coil 12 is composed of windings 14 and 15 which are wound in series about each of these paths respectively.

Figure 3:
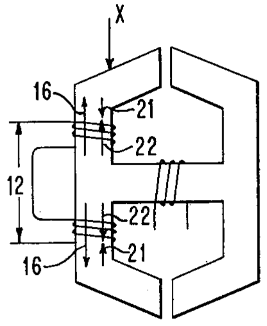
FIG. 3 is a diagram showing flux in a steady state and also during stress.

In a steady state condition, the reluctance of the paths 1–A–B–4–3 and 2–C–D–5–3 are equal and therefore the magnetic flux, as indicated by the vectors 16 in FIG. 3, are equal in each leg 1 and 2.

Figure 2:
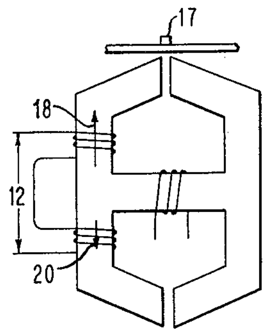
FIG. 2 is a diagram showing flux density during sensing.

In a normal reading head of a reluctance type, the winding 15 would be omitted and any change in flux over path 1–A–B–4–3 would result in a signal being generated in a winding 14. In the form illustrated the windings are connected so that they are series aiding in such a manner that during reading as indicated in FIG. 2 if a magnetic bit 17 on a non-magnetic record material bridges gap A—B the magnetic circuit is unbalanced and the flux passing through the winding 14 increases as indicated by vector 18 and that through winding 15 decreases as shown by vector 20. This results in a current being induced in windings 14 and 15 which produces a signal across the reading coil 12.

If at some time between actual signals a mechanical strain is set up by a card or tape hitting a point X (FIG. 3) a compression wave will travel down the core causing the permeability of the material to decrease along its entire length due to the Villari effect. This of course is assuming that the material is positively magnetostrictive. As shown in FIG. 3, the pressure at X will cause a resultant change in permeability of the core which would be the same in both legs 1 and 2 and, assuming positive magnetostriction, would reduce the flux in these legs by the same amount as indicated by vector 21 resulting in an equal but reduced flux in each leg (vector 22). Since these would induce currents in the coil windings 14 and 15 that are equal but opposite they would cancel each other so no voltage would appear across reading coil 12 and thus no signal would be given.

The magnitude of the Villari effect increases as the flux density in the magnetic material increases and therefore reluctance change type sensing heads, which are biased at a fairly high flux density, are more microphonic than flux changing heads. However, flux change reading heads are normally not completely demagnetized and therefore are somewhat microphonic. In this instance the same series aiding in the circuit minus the biasing coil 11 may be used to reduce the microphonics.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An electromagnetic reading head comprising a figure eight shaped core with a non-magnetic gap at the top and bottom thereof, a bias winding on the cross bar of said core, a unidirectional source for energizing said bias winding, a winding disposed in series above and below said cross bar and means for effecting a change in magnetic induction within said core due to mechanical stress said change being overcome by said series winding.

2. An electromagnetic reading head comprising a core having two pair of legs arranged with non-magnetic gaps between said opposing pairs, a cross bar connecting said pairs of legs, a winding series wound on legs above and below said cross bar, a unidirectional source for energizing said bias winding, a bias winding wound on said cross bar, in a steady state the total flux produced in the series winding above said cross bar is substantially equal to the flux produced in the series winding below said cross bar, and means exerting a mechanical strain in said core to create a change in induction within said core, said change due to mechanical strain being balanced out by said series winding.

3. In a reading head a core having two equal legs forming air gaps above and below a cross bar joining said legs, a pair of windings wound in series on one leg of said core above and below said cross bar and a bias winding on said cross bar energized by a unidirectional source, said bias winding generating equal flux paths in said legs, a magnetic material disposed across one of said air gaps unbalancing said flux path in said legs to generate a signal in said series windings and means exerting a deforming effect on said core to create a change in magnetic induction, said series windings balancing out said change.

4. An electromagnetic reader head comprising a core having a figure eight configuration with a non-magnetic gap at the top and a second non-magnetic gap at the bottom thereof, a signal winding wound in series on one leg of said core above and below the cross bar and a bias winding on said cross bar energized by a unidirectional source, said bias winding creating opposite but equal flux in the flux paths of the upper and lower half of said core, and means subjecting said core to a mechanical strain, such that equal but opposite voltage signals will be produced in said serial windings said signals being proportional to, equal but opposite changes in flux as a result of said strain thereby reducing the noise in signals generated in said signal winding.

References Cited in the file of this patent

UNITED STATES PATENTS

| | | |
|---|---|---|
| 2,351,004 | Camras | June 13, 1944 |
| 2,351,011 | Camras | June 13, 1944 |
| 2,539,876 | Von Behren | Jan. 30, 1951 |
| 2,666,813 | Camras | Jan. 19, 1954 |

FOREIGN PATENTS

| | | |
|---|---|---|
| 805,434 | France | Aug. 22, 1936 |

UNITED STATES PATENT OFFICE

CERTIFICATE OF CORRECTION

Patent No. 3,048,666 August 7, 1962

Richard G. Neville

It is hereby certified that error appears in the above numbered patent requiring correction and that the said Letters Patent should read as corrected below.

Column 2, lines 56 and 57, strike out "a bias winding wound on said cross bar,", and insert the same after "bar," in line 55, same column 2.

Signed and sealed this 27th day of November 1962.

(SEAL)

Attest:

ESTON G. JOHNSON

XXERNESTXXWXXSWIDER

Attesting Officer

DAVID L. LADD

Commissioner of Patents